Dec. 24, 1940.  G. E. MILLER  2,226,009
HOP SEPARATOR
Filed Oct. 18, 1939  2 Sheets-Sheet 1

INVENTOR.
George E. Miller.
BY Chas. E. Townsend.
ATTORNEY.

INVENTOR.
George E. Miller.
BY
Chas. E. Townsend.
ATTORNEY.

Patented Dec. 24, 1940

2,226,009

UNITED STATES PATENT OFFICE 2,226,009

HOP SEPARATOR

George E. Miller, Sacramento, Calif., assignor to E. Clemens Horst Company, San Francisco, Calif., a corporation of New Jersey Application October 18, 1939, Serial No. 299,986

3 Claims. (Cl. 209—12)

This invention relates to a separator, and especially to a machine for separating stems, leaves and like foreign material from picked hops. The present application is a continuation in part of my co-pending application Serial No. 234,582, filed October 12, 1938, for "Hop separator."

The picking of hops by means of machinery has been in continuous use on a comparatively large scale in California and other States at least since 1910, and is now a comparatively old art. The type of machine generally employed consists of a series of revolving drums and belts, from the surfaces of which project V-shaped flexible wire fingers. The vines to be picked are passed over and under the drums and belts by a conveyor, and as the vines pass through they are combed by the V-shaped fingers and the hops are removed during the combing operation. Practically all of the leaves and a great proportion of the stems are also removed; thus, after the picking operation is completed, it becomes necessary to separate the hops from the leaves, stems and other foreign material, as the cleaner the hops the higher the market value of the same.

While several types of separators are in use, the type disclosed in Letters Patent No. 2,138,529, entitled "Hop separator," issued November 29, 1938, to Edouard Thys, is probably the most efficient, but it has one fault in common with other separators, and that is that only a small proportion of the stems are removed.

In general, the hop separator above referred to comprises an inclined pervious belt with a suction fan or propeller positioned behind or under it. This propeller is rotated at a sufficiently high speed to cause a continuous flow of air through the pervious belt, so that when hops, stems, leaves, etc., are deposited on the belt, the leaves will adhere to the surface of the belt but the hops, due to the smaller area presented and their round shape, will be allowed to roll down the incline presented and to be discharged as comparatively clean hops. The pervious belt employed in this type of machine is of comparatively closely-woven wire, but it is nevertheless sufficiently open to permit the air to be freely drawn therethrough. In actual practice, it has been found that the only stems which are removed are those which adhere to the leaves, and as such are carried over with the same, but stems which happen to fall on portions of the belt which are not covered with leaves will slide down the incline and discharge with the hops, as the area presented by the individual stems is not sufficiently large to permit the suction or air force to hold them.

In working with the hop separator just described, I decided to experiment with different types of pervious separator belts; that is, belts constructed of different materials and mesh, to determine if it was possible to remove not only the leaves but also the major portion of the stems. As a result I have discovered that if the woven wire belt previously used is replaced with netting material constructed of textile cord such as is used, for instance, in the manufacture of fish nets, and that if the mesh of the netting material is maintained slightly smaller than the average size of the hops to be separated, the smaller stems will drop through the openings formed between the meshes of the net, while the larger stems, with hooks or branches, will become hung up in the meshes of the netting material and will be carried over with the leaves, with the result that substantially all the stems are removed together with the leaves, and that clean hops of a very high grade are obtained.

One illustration of the hop separator, shown in the present application, is substantially identical with the machine shown in Patent No. 2,138,529 referred to above, the main difference being that a fabric netting material is substituted for the closely-woven wire mesh previously used. The netting material is also applicable to other types of hop separators, one form of which is also disclosed. In the drawings, Fig. 1 is a central vertical section of the type of separating machine shown in the co-pending application previously referred to;

Figure 1:
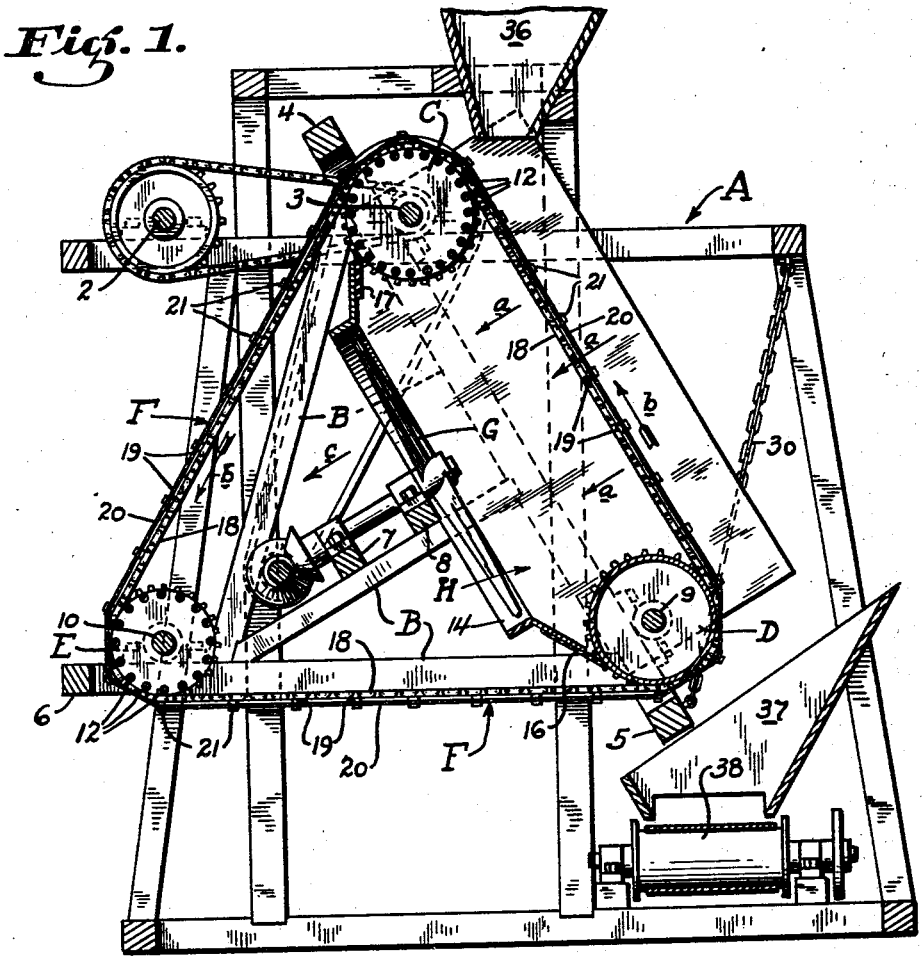

Referring to the drawings in detail, and particularly to Fig. 1, A indicates a main frame, crosswise of which is journaled a drive shaft 2 and a driven shaft 3. Pivotally mounted on shaft 3 are a pair of spaced triangular shaped frames B. These frames are tied together by cross bars 4, 5, 6, 7 and 8 to cause the frames to swing as a unit, as will hereinafter be described.

Extending crosswise of the triangular frames B and journaled therein, are cross shafts 9 and 10, and secured on the shafts 3, 9 and 10, between the frames B, are drums generally indicated at C, D and E. The drums C and E are identical in construction. They consist of circular end plates or head members, one at each end of the respective shafts, between which are secured closely spaced rods or bars, such as indicated at 12. The drum D is an ordinary closed drum with a head at each end. This drum, together with the drums C and E, serves as a support for an endless separating belt F. This belt is constructed of a netting material, which may be manufactured from a textile material, that is, cord of the type used in the manufacture of fish nets. The meshes of the net are fairly large, but they are slightly smaller than the average size of the hops to be separated, so as to permit the hops to roll down the inclined surface of the net, as will hereinafter be described. The coarse structure, or the comparatively large meshes formed in the net permit air to be freely drawn therethrough in the direction of arrow $a$, by means of a fan or propeller blades such as shown at G, or other suitable suction or air propelling mechanism.

A housing H is secured between the triangular frames B on the under side of the drums C and D. This housing has an opening 14 formed therein, for the reception of the fan G. The housing otherwise forms a closure for the under side of the drum just referred to, and the housing is also extended upwardly toward the separating belt F at each end, to restrict the air flow, or in other words to cause it to pass through the separating belt only. The air also passes through the drum C, the bars 12 secured between the end plates of the drum being spaced apart such a distance that air will pass freely through the belt and between the rods and then downwardly into the housing to be discharged by the fans.

The housing is made as leak-proof as possible so as to cause all of the air to pass through the belt and the drum C. Rubber flaps are provided, as shown at 16 and 17, which are engageable with the surfaces of the respective drums to avoid air leaks as much as possible. The fan G, together with the drum C, which is the driver for the separating belt, are all driven in any suitable manner.

On opposite ends of the shafts 3, 9 and 10 are sprocket gears which align with each other, and carried and driven thereby are chains 18 which are connected by cross-slats 19. The netting material forming the subject matter of this application is indicated at 20, and is secured to the cross-slats 19 by being clamped between said slats and a second set of slats 21.

The separating belt, as clearly shown in Fig. 1, assumes a rather steeply-inclined position, but this incline may be varied by means of one or more adjustable chains such as shown at 30. In actual operation, with the separating belt traveling in the direction of arrow $b$, the picked hops, mixed with leaves, stems, etc., will be delivered to the upper end of the belt by means of a hopper 36. The hops themselves are fairly round in shape, and are heavy in comparison to the leaves, stems, etc. As the hops strike the surface of the separating belt or the netting material employed, they will roll down the steeply inclined slotted surface and will finally discharge into the hopper 37, which delivers them to a discharge conveyor 38. The suction action produced by the fan G will at the same time cause the leaves to adhere to the surface of the netting material, and they will continue to adhere thereto until the netting material passes over the drum C, and at this point the belt or netting material is relieved of the suction action and most of the separated material will fall by gravity to the rear of the machine, where it may be removed in any suitable manner, not here shown. Any material tending to adhere will, however, be blown off, as there is a heavy blast of air discharging from the fan or propeller blades in the direction of arrow $c$.

The stems encountered are of two varieties. Some stem sections are almost straight, and comparatively short. These, when deposited on the netting material, will fall between the meshes into the fan housing, and will be blown out. Other stems are larger and longer, and have arms or branches formed thereon. These are too large to fall between the meshes of the net, and as such will be hung up by the slats 21 or will hook into the netting and will be carried over with the leaves and discharged therewith. In this manner the stems which previously formed a problem are substantially removed, and for all practical purposes may be said to have been completely removed, as comparatively few, if any, can slide down the surface of the netting material into the hopper 37 due to the cross-slats 21.

Figure 2:
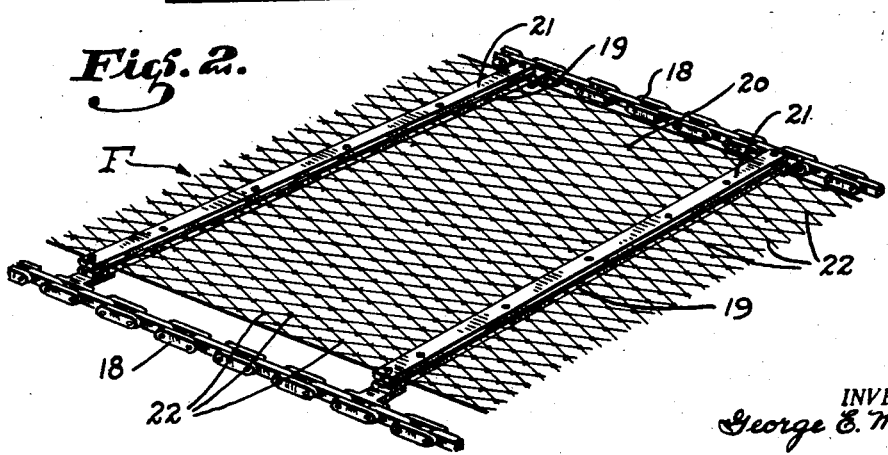
Fig. 2 is a perspective view of a portion of the pervious separator belt forming the subject matter of this application.

By referring to Fig. 2, it will be noted that knots 22 are formed at all points where the fabric strands cross each other. This is of considerable importance as it produces small projections, or in other words, a rough surface, which materially increases the efficiency of the belt. This, together with the fact that the fabric cord from which the net is woven presents a nap-like surface, further increases the tendency for leaves, petals and stems to adhere to the surface of the netting. It should also be noted that the net is woven to produce an elongated diamond mesh. This produces elongated openings through which small straight stems can readily fall; furthermore, such openings tend to catch hold of slight projections on the leaves and stems, thereby further increasing the separating efficiency of the belt. Also, the resiliency of the separating surface is increased, which is a desirable feature.

Figure 3:
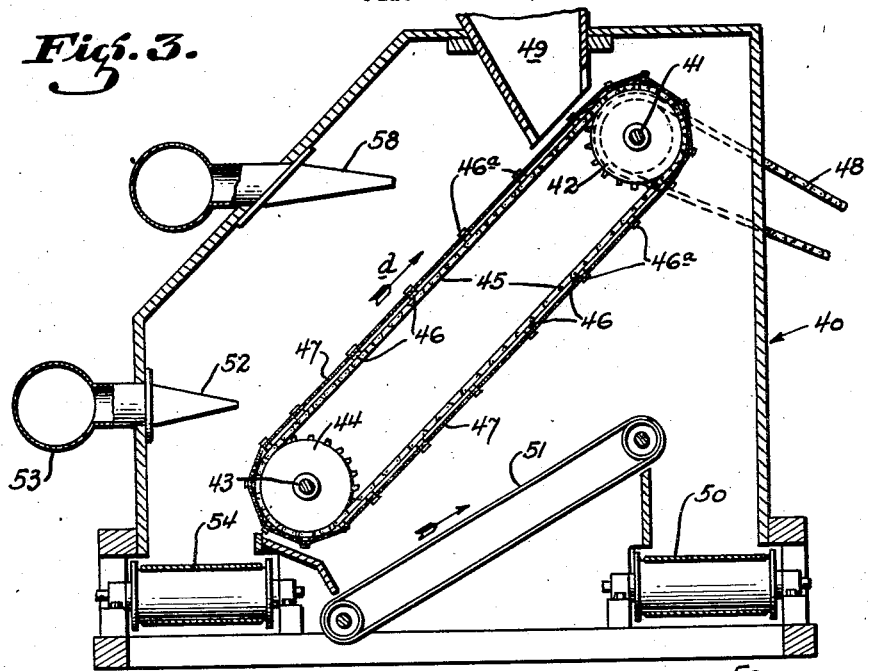
Fig. 3 is a central vertical section showing another form of separator.
Figure 4:
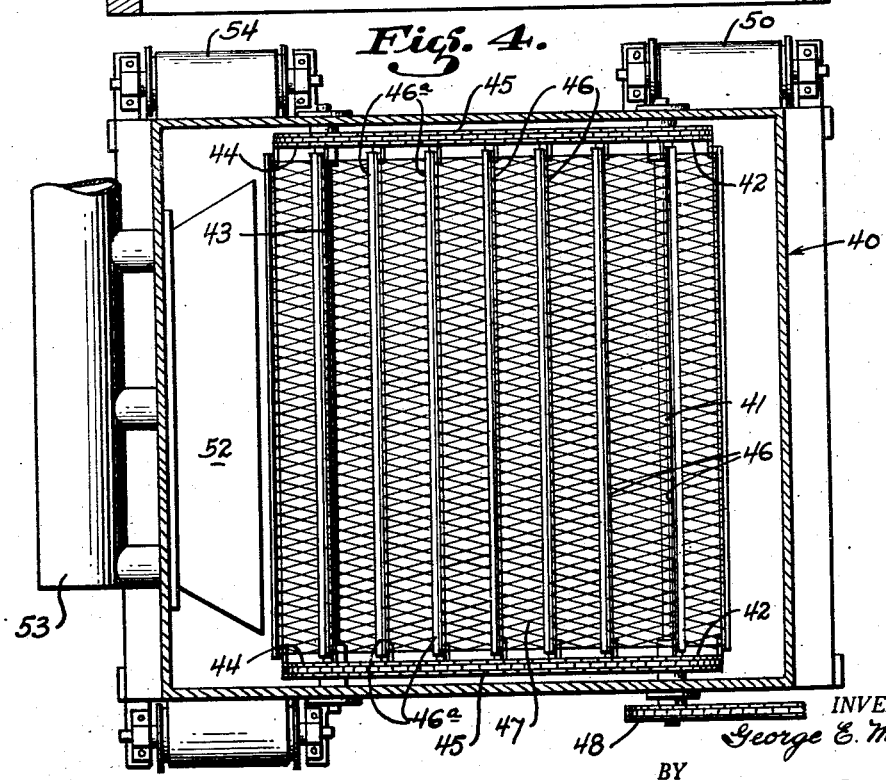
Fig. 4 is a plan view of the same, showing the upper part of the housing in section.

Use of the netting material as a separator belt is not limited to the type of machine shown in Fig. 1, as it has been found equally applicable to the type of machine shown in Figs. 3 and 4. This machine comprises a frame or housing generally indicated at 40. Journaled in the upper end and extending crosswise thereof is a drive shaft 41, on the opposite ends of which are secured sprocket gears 42. A similar shaft 43 is journaled in the lower part of the housing, and this is also provided with sprocket gears 44. Endless chains 45 pass around each pair of sprockets, and cross-slats 46 connect the chains. These slats support a netting material 47, identical with the netting material shown in Fig. 2, the netting material being secured in place by the slats 46a. Shaft 41 with the sprockets secured thereon is driven from any suitable source, or by the chain shown at 48. The chains, and the belt or netting material carried thereby, travel in the direction of arrow $d$. The picked hops to be separated are delivered to the upper end of the belt through a hopper 49. The hops will, as in the other instance, roll down the steep incline presented by the belt or netting material. Small stem sections will drop through the meshes forming the netting, while larger stems will become hung up. Leaves will also tend to adhere, and thus will be carried over the upper shaft 41 and deposited on a discharge conveyor 50. The stems falling through the netting material are received by a conveyor 51 which discharges into conveyor 50.

In actual practice, it has been found that while a current of air through the netting is desirable and beneficial, particularly to cause complete removal of the leaves, fairly good results can be obtained without it. Also, good results are obtained by merely directing a blast of air against the face of the belt, through one or more wide nozzles such as shown at 52 and 58, the air being delivered from any suitable source, such as a blower, not shown, by the pipe or manifold 53. The clean hops rolling down the belt are discharged onto a conveyor 54, while the foreign material, such as stems, leaves, etc., is delivered to the conveyors 50 and 51.

The operation of the machine shown in Figs. 3 and 4 is substantially the same as that of the machine shown in Figs. 1 and 2.

While good results have been obtained with netting material made both from wire and from textile cord, that is, cord similar to so-called "fish line," or that used in the manufacture of fish nets, the fish-net type of pervious belt seems to give the best results; and while this and other features of my invention have been described and illustrated in more or less specific form, I nevertheless wish it understood that changes may be resorted to within the scope of the appended claims.

Having thus described and illustrated my invention, what I claim and desire to secure by Letters Patent is:

1. In a machine for separating hops from leaves, stems and other foreign material, a pair of spaced endless sprocket chains, upper and lower pairs of sprocket gears to support the chains, cross-bars connecting the chains, a pervious separator belt composed of netting material woven from textile cords supported by the cross-bars, cross-slats disposed on top of the netting material and securing said material to the cross-bars, said net and the chains supporting the same being disposed on an incline, means for imparting continuous movement to the belt in a direction to cause it to travel up the incline, means for maintaining a continuous flow of air through the netting material, and means for depositing hops, leaves and stems on the netting material at a point adjacent the upper end, the mesh in said netting material being slightly smaller than the hops to be separated, to permit the hops to roll down the inclined surface presented by the netting material, the mesh in said netting, and the cross-slats, retaining the leaves and large stems but permitting smaller stems to fall though the mesh of the netting material.

2. In a machine for separating hops from leaves, stems and other foreign material, a pair of spaced endless sprocket chains, upper and lower pairs of sprocket gears to support the chains, cross-bars connecting the chains, a pervious separator belt composed of netting material woven from textile cords supported by the cross-bars, knots formed at the points where the cords intersect each other to form the meshes of the netting material, cross-slats disposed on top of the netting material and securing said material to the cross-bars, said net and the chains supporting the same being disposed on an incline, means for imparting continuous movement to the belt in a direction to cause it to travel up the incline, means for maintaining a continuous flow of air through the netting material, and means for depositing hops, leaves and stems on the netting material at a point adjacent the upper end, the mesh in said netting material being slightly smaller than the hops to be separated, to permit the hops to roll down the inclined surface presented by the netting material, the mesh in said netting, the knots formed at the intersection of the meshes, and the cross-slats, retaining the leaves and large stems but permitting smaller stems to fall through the mesh of the netting material.

3. In a machine for separating picked hops from leaves, stems and other foreign material, a pervious separator belt composed of textile netting material having a diamond-shaped mesh slightly smaller than the size of the hops to be separated, means for disposing the belt on a sufficiently steep incline to cause hops deposited on the surface of the belt adjacent the upper end thereof to roll down the incline and off the belt, means for imparting continuous movement to the belt in a direction opposite to the rolling hops, and means for maintaining a continuous flow of air through the belt with sufficient velocity to cause leaves and the like to adhere thereto.

GEORGE E. MILLER.